United States Patent [19]

Schabinger

[11] Patent Number: 4,739,968

[45] Date of Patent: Apr. 26, 1988

[54] A DISC VALVE CONTROL MEANS

[76] Inventor: Gunter Schabinger, D-7530 Pforzheim-Huchenfeld, Am Waisenbusch 3, Fed. Rep. of Germany

[21] Appl. No.: 14,284

[22] Filed: Feb. 13, 1987

[30] Foreign Application Priority Data

Mar. 8, 1986 [DE] Fed. Rep. of Germany ....... 3607798

[51] Int. Cl.[4] .......................... F16K 5/00; F01L 1/32

[52] U.S. Cl. .................................. 251/304; 251/313; 123/80 D; 123/90.28; 123/190 D

[58] Field of Search ............ 123/80 R, 80 D, 80 BA, 123/81 R, 81 D, 90.3, 90.11, 90.28, 190 R, 190 A, 190 D; 251/161, 188, 192, 313, 304, 305, 306

[56] References Cited

U.S. PATENT DOCUMENTS

| | | | |
|---|---|---|---|
| 3,051,156 | 8/1962 | Aspin | 123/190 D |
| 3,126,193 | 3/1964 | Atherton | 251/306 |
| 4,562,993 | 1/1986 | Lew | 251/161 |

FOREIGN PATENT DOCUMENTS

| | | | |
|---|---|---|---|
| 55-84807 | 6/1980 | Japan | 123/90.15 |
| 60-6010 | 1/1985 | Japan | 123/90.39 |

OTHER PUBLICATIONS

0092869 European Patent Appl., 11/1983, Van de Vel.

*Primary Examiner*—Samuel Scott
*Assistant Examiner*—Noah Kamen
*Attorney, Agent, or Firm*—Balogh, Osann, Kramer, Dvorak, Genova & Traub

[57] ABSTRACT

The invention relates to a valve-controlled system, particularly for use in an internal combustion engine, comprising a valve stem and a valve disc extending at an oblique angle to the axis of the valve stem. The valve disc is adapted to be lifted from an associated valve seat and is non-circular and preferably elliptical. By means of a turning drive the valve is adpated to be rotated to open and close chambers or passages which open into the valve seat.

11 Claims, 4 Drawing Sheets

A DISC VALVE CONTROL MEANS

BACKGROUND OF THE INVENTION

1. Field of the Invention

This invention relates to a valve-controlled system, particularly for use in an internal combustion engine, comprising a valve stem and a valve disc that extends at an oblique angle to the axis of the valve stem and is adapted to be moved into and out of contact with an associated valve seat.

2. Description of the Prior Art

Conventional disc valves comprise a circular valve disc, which defines a plane that is at right angles to the axis of the valve stem. When the valve is closed the valve disc lies on a frusto-conical seating surface. During the opening of such valves the annular passage being opened presents a high resistance to flow.

JP No. 60-6010 discloses a valve-controlled system comprising a valve which is of the kind described first hereinbefore and in which the valve disc extends at a predetermined oblique angle to the axis of the valve stem. In that case the resistance to flow will be reduced so that the efficiency of the inlet and exhaust operations can be increased.

JP No. 55-84807 discloses a valve disc which is provided with an obliquely cut hollow cylinder, which has associated with it a complementary valve seat. The circular valve disc can be rotated about its axis so that the time for which the valve is open can be decreased in dependence on the rotational position of the valve disc.

SUMMARY OF THE INVENTION

It is an object of the invention to provide a valve-controlled system for connecting a compression chamber to auxiliary chambers or passages by the opening and closing of a valve so as to vary the compression ratio.

In a valve-controlled system, particularly for an internal combustion engine, comprising a valve which has a valve stem and a valve disc that defines a plane including an oblique angle to the axis of the valve stem and can be moved into and out of contact with an associated valve seat that object is accomplished in accordance with the invention in that the valve disc is non-circular and is rotatable by a turning drive so as to establish and interrupt a communication with chambers or passages which open into the valve seat. The turning drive may impart an oscillating rotation or a unidirectional stepwise rotation to the valve disc.

The valve disc is suitably elliptical and eccentric to the valve stem. The turning drive may be controlled for a cyclic operation, e.g. in step with the cyclic operation of the engine, or may be controlled by a computer in dependence on other variables.

The valve seat has suitably a seating surface having the shape of a hollow frustum of a cone, and the valve disc may consist of an oblique conic section of the conical seating surface and may be concentric or eccentric to the valve stem. In such an arrangement the resistance to flow known from the known valve systems will be effective only during an oscillating motion whereas during a unidirectional rotation through part of a revolution the opening of a chamber or passage opening in the frustoconical valve seat surface can be opened or closed without a restriction of the flow area. After a reverse rotation the valve head will again lie on the associated seat so that the valve-controlled system has a wide field of application. For instance, the valve-controlled system in accordance with the invention can be used to effect a stepwise change of the compression ratio in internal combustion engines having a variable compression volume.

A variation of the compression ratio is permitted in that an auxiliary chamber is associated with the valve and opens in the seating surface of the valve seat. When a spark-ignited internal combustion engine—Otto engine—is operating under a light load, the valve will be rotated to close the auxiliary chamber so that the compression ratio will be increased. As the volumetric efficiency increases, the valve is rotated to open the auxiliary chamber so that the compression ratio is decreased and knocking will be prevented. The need for opening or closing the auxiliary chamber may be indicated by the position of the throttle valve or by an initial knocking and can be detected by sensors and can be processed in a computer together with other relevant sensor signals. In that case a partial rotation is imparted to the valve by means of a computer-controlled turning drive.

In the proposed system the gas forces are directly introduced into the cylinder head during the working stroke via the valve disc and the valve seat whereas they will not affect the turning drive. A coking of sealing surfaces which are of functional significance will be prevented because the sealing surfaces are kept free from deposits as the valve is oscillated or is rotated in a controlled manner.

In addition to the application described hereinbefore the valve in accordance with the invention provided with an auxiliary chamber may be used to reduce or increase the compression ratio in dependence on the operating conditions of a compression-ignition engine—diesel engine—particularly when it is highly supercharged. In that case the opening and closing of the auxiliary chamber may be controlled, e.g., in dependence on pressure or on flow rate.

The applications which have been described permit an optimum process control as regards efficiency and exhaust action. The field of application of the valve system in accordance with the invention is not restricted to internal combustion engines.

DETAILED DESCRIPTION OF THE PREFERRED EMBODIMENTS

Figure 1:
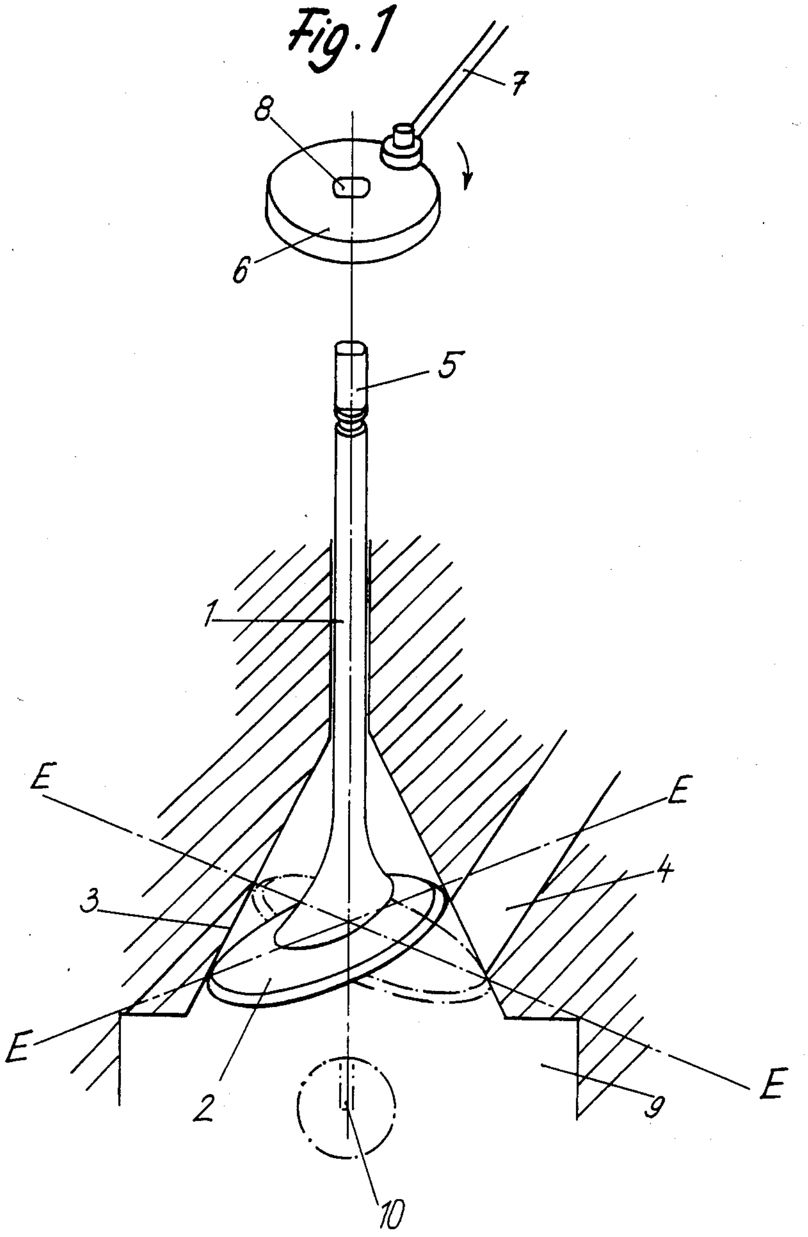
FIG. 1 is a diagrammatic sectional view showing a valve having a valve stem and a valve disc disposed in a valve seat provided in a cylinder chamber and shows an auxiliary chamber at one end and an attachable turning drive at the other end of the valve.

Various embodiments of the valve-controlled system in accordance with the invention will now be described more in detail with reference to the drawing.

In the embodiment shown in FIG. 1 the valve comprises a valve stem 1 carrying an elliptical valve disc 2, which has a rim extending in a plane E—E which includes an oblique angle with the axis of the valve stem 1. The valve disc 2 is disposed in a recess that is defined by a seating surface 3 of a valve seat. The valve disc 2 is adapted to be oscillated or unidirectionally rotated in steps about the axis of the valve stem 1 so that it can be used to open or close the auxiliary chamber 4.

The recess that is defined by the seating surface 3 has the shape of a frustum of a cone, in which the valve disc 2 is disposed as an oblique conic section which is eccentric to the valve stem 1.

Figure 5:
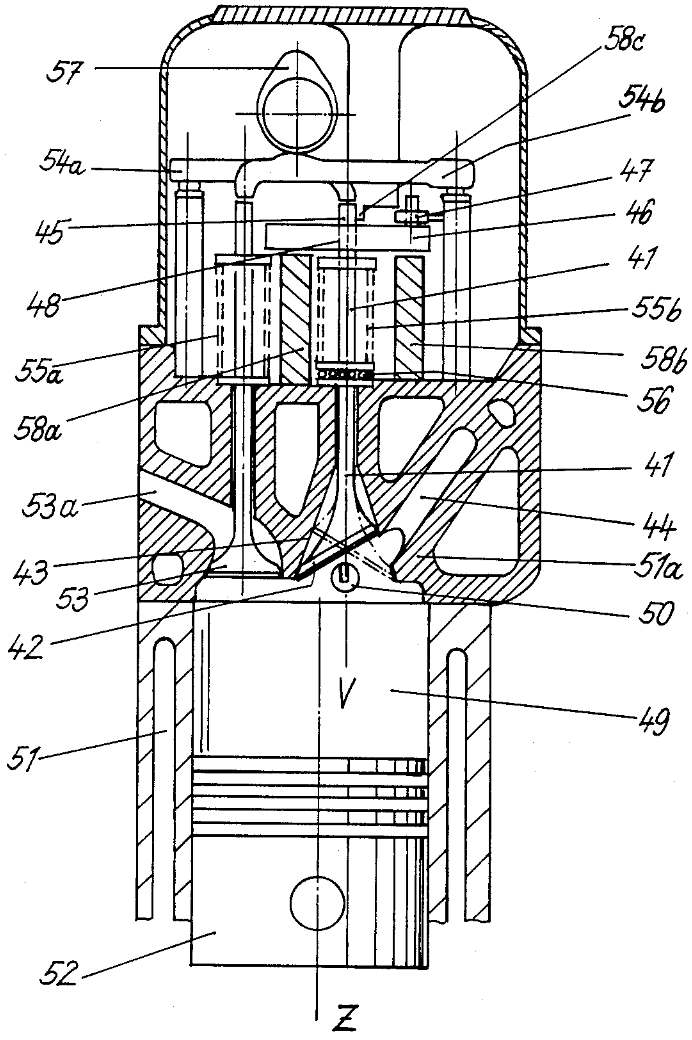
FIG. 5 is a sectional view showing a cylinder and piston of an internal combustion engine together with a diagrammatically shown valve system and control means.

The end portion 5 of the valve stem 1 which is opposite to the valve disc 2 is non-rotatably connected to a turning drive, which comprises a turning wheel 6, to which a drive arm 7 is eccentrically connected. The wheel 6 has an oval hole 8, in which the oval end portion 5 of the valve stem is axially slidably fitted to non-rotatably connect the valve stem 1 to the turning wheel 6. The valve stem 1 is axially movable in known manner by means of a camshaft, which lifts the valve stem against the force of a valve spring, which is shown in FIG. 5. The recess defined by the seating surface 3 communicates through a passage with the cylinder chamber 9, which is provided with a spark plug 10. As is indicated in phantom, the auxiliary chamber 4 is adapted to be opened and closed by the rotation of the valve disc 2.

Figure 2:
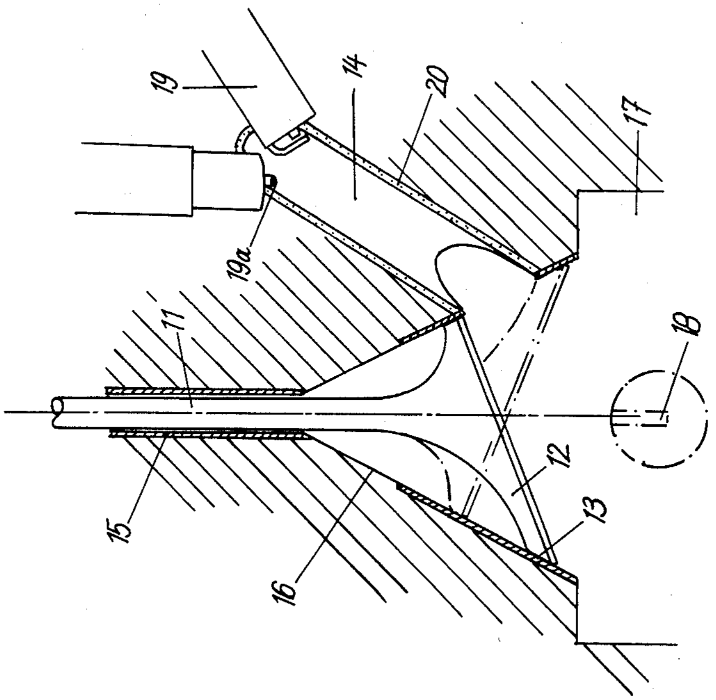
FIG. 2 is a diagrammatic sectional view showing a valve comprising a valve stem and a valve disc disposed in the valve seat in the cylinder chamber of an engine with dual ignition.

In the embodiment shown in FIG. 2 the valve comprises a valve stem 11 and a valve disc 12. The latter defines an oblique conic section in a frustoconical recess defined by a valve seat 13 and is adapted to open and close the auxiliary chamber 14 in the manner described hereinbefore. A valve guide 15 is also shown in FIG. 2 as well as an exhaust passage 16, which communicates with the recess that is defined by the valve seat 13. A spark plug 18 extends into the combustion chamber 17. An additional spark plug 19 and a fuel injection nozzle **19*a* extend into the auxiliary chamber 14. An engine provided with such a valve assembly should be supplied with a lean mixture when the auxiliary chamber 14 is closed and should be operated partly or entirely with a stratified charge when the auxiliary chamber 14** is open. A limitation of the load will facilitate the operation with a stratified charge.

Engines having one spark plug per cylinder can be combined with a lambda=1 catalyst or with a controlled catalyst.

Owing to the period of high compression a higher thermodynamic efficiency is obtained than in conventional engines. Besides, with the valve assembly shown in FIG. 2 the engine can be supplied with a lean mixture. The control of compression ratios to two or more values will facilitate the operation with a lean mixture because a high compression ratio is used and high turbulence is created in the combustion chamber.

In compression-ignition engines the auxiliary chamber 14 should be lined with heat-insulating material 20, preferably with a ceramic material. That design can be adopted for a control of the compression ratio to two or more values. In case of a low basic compression ratio the auxiliary chamber 14 or auxiliary chambers can be opened to ensure a more reliable starting and to provide a combustion chamber volume which is adapted to the load. That design is believed to be interesting from mechanical and thermodynamic aspects in highly supercharged engines and in engines permitting a disconnection of cylinders.

Figure 3:
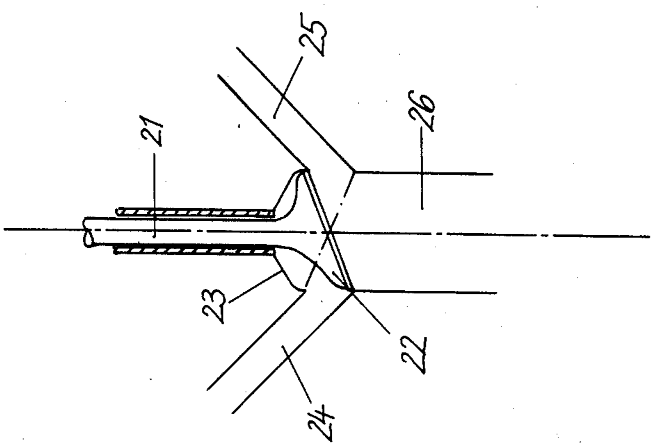
FIG. 3 is a diagrammatic sectional view showing a valve comprising a valve stem and a valve disc in a main passage and shows also auxiliary passages.

In the embodiment shown in FIG. 3, the valve comprises a valve stem 21 and a valve disc 22, which cooperates with a seating surface 23, which defines a main passage. Auxiliary passages 24 and 25 can be opened to and shut off from the main passage 26 by means of the valve disc 22.

The valve in accordance with the invention can be arranged in the inlet and/or exhaust port region of internal combustion engines and can generally be used in mechanical engineering to open and close chambers and passages without a restriction of the flow area. This shows that the valve assembly in accordance with the application has a very wide field of application.

Figure 4:
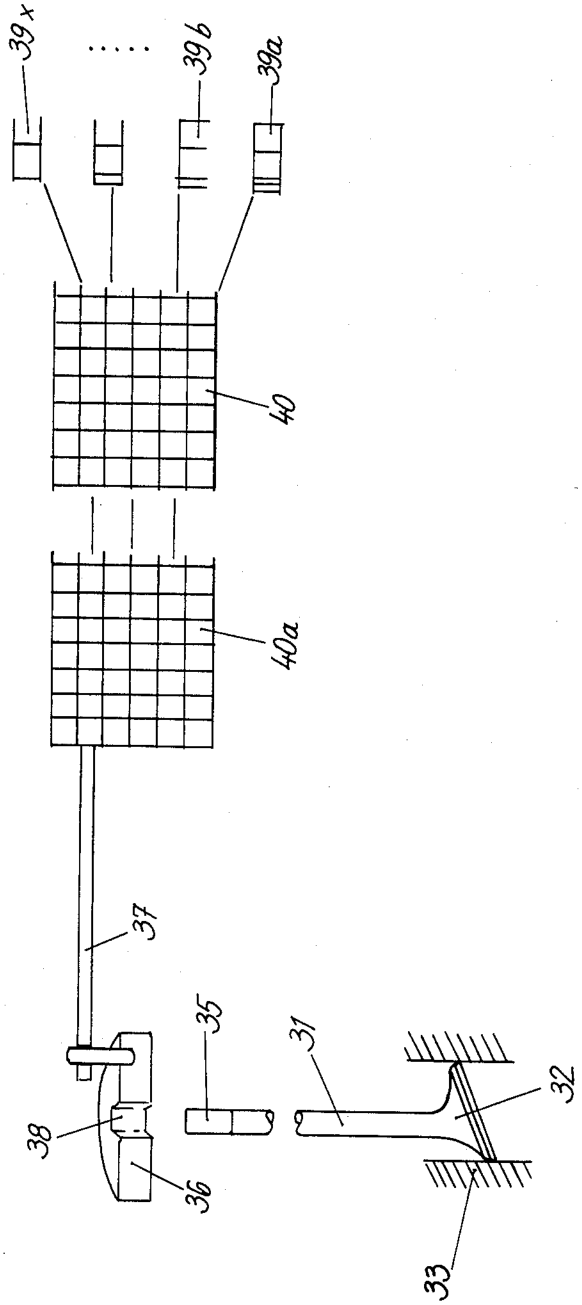
FIG. 4 is a diagrammatic representation of a valve comprising a valve stem and a valve disc as well as a turning drive and a control system.

The valve shown in FIG. 4 comprises a valve stem 31, a valve disc 32 and a valve socket 33. At its end portion 35 that is opposite to the valve disc 33, the valve stem 31 is fitted into a turning wheel 36, to which drive arms 37 are eccentrically connected. The turning wheel 36 has an oval hole 38, which is non-rotatably connected to the oval end portion 35 of the valve stem 31 but is axially slidable thereon.

FIG. 4 shows also the entire turning drive as well as sensors **39*a* to 39*x*. For instance, a knock sensor 39*a* can deliver to the computer a signal calling for a lower compression ratio. As a result, the computer 40 delivers a control signal to the turning drive 40*a*, which then rotates the valve disc 32 through the required angle, as has been described hereinbefore. The sensor 39*b* for detecting the position of the throttle valve may generate a signal which results in a similar manner in an increase of the compression ratio. Additional sensors up to 39*x*** are provided for a more suitable automatic control of the engine, e.g., in dependence on temperature, pressure, flow rate and load.

The computer 40 may be integrated in a central computer and may be operated in accordance with programs for starting and for emergency operation. Such programs are designed to provide for the mechanical function of the internal combustion engine and for its reliability in operation. In order to prolong the service life of the valve and valve seat, the turning drive **40*a*** may be arranged to turn the valve disc through a few degrees after an operation for a certain interval of time. That program will not influence the process. A coking of the valve seat will be prevented by the normal load cycle and by the turning of the valve in dependence thereon. In case of an operation for a prolonged time in which the auxiliary chamber has always been open or has always been closed, the need for a brief load change may be indicated by a suitable signal program or may be initiated by such program. The program may be continuously applicable to individual combustion chambers or to the entire internal combustion engine.

FIG. 5 is a transverse sectional view showing an internal combustion engine in which the valve in accordance with the invention is incorporated. The valve comprises a valve stem 41, on which the valve disc 42 is mounted, which cooperates with a seating surface 43 and serves to open and close the auxiliary chamber 44. At that end portion 45 of the valve stem 41 which is opposite to the valve disc 42, the valve stem 46 is connected to a turning wheel 46, to which a drive arm 47 is eccentrically connected. The wheel 46 has an oval hole 48, which is axially slidably fitted on and non-rotatably connected to the oval end portion 45 of the valve stem 41. A spark plug 50 extends into the combustion chamber 49 of the cylinder of the internal-combustion engine, which may consist, e.g., of a four-stroke cycle engine.

The combustion chamber 49 is formed in a cylinder block 51, which contains a piston 52, which defines the combustion chamber at its bottom and is movable to change the volume of the combustion chamber. The cylinder head 51a is provided, e.g., with an inlet valve 53, with an exhaust valve, not shown, and with a valve 41, 42 in accordance with the invention. In the embodiment shown the longitudinal axis Z of the cylinder and the longitudinal axis V of the shaft of the valve 41, 42 in accordance with the invention are parallel. Alternatively, said axes may extend at an angle to each other. In the latter case a partial rotation of the valve 41, 42 can be transmitted by a camshaft 57 and motion-transmitting elements and/or a turning drive 40a to effect a temporary overlap of the valve discs if the angle between V and Z is properly selected. Conventional actuators are associated with the inlet valve 53, the exhaust valve, not shown, and the valve 41, 42 in accordance with the invention and may comprise rocker arms 54a–54x and valve springs 55a–55x. The valve lifts and the valve spring forces differ for the valves which control the exhaust and refill cycle and for the valve which is in accordance with the invention and controls only the opening and closing of the auxiliary chamber 44. The valve spring 55b bears on a rotary bearing 56. The valves are operated by means of a common camshaft 57.

The valve 41, 42 is to be rotated when the pressure in the combustion chamber 49 is low and preferably when the inlet valve 53 or the exhaust valve, not shown, is open. The rotation of the valve 41, 42 can be facilitated by the provision of a ball bearing 56 under the valve spring 55b. The turning mechanism 46, 47 bears on abutments 58a to 58x and is retained by them. Before its partial rotation the valve 41, 42 is slightly lifted from the seating surface 43 so that the wear of the valve and of the valve seat will be reduced and their life will be prolonged.

The valve 41, 42 in accordance with the invention may also be used to control an inlet passage 53a and an exhaust passage, not shown, or for a control of an inlet or exhaust passage and an associated auxiliary chamber. The number of adjusting mechanisms will be reduced if two or more valves in accordance with the invention are interconnected by a linkage.

I claim:

1. In a disc valve control system comprising
valve seat means having a seating surface and defining a passage communicating with said seating surface,
a valve stem having an axis, and
a valve disc secured to said valve stem and defining adjacent to said seating surface a plane that extends at an oblique angle to said axis,
said valve stem being supported by means for axial movement to move said valve disc into and out of seating contact with said seating surface in said plane,
the improvement residing in that
said valve disc is non-circular,
turning means are slidably engaged by said valve stem for rotating said valve stem about said axis so as to rotate said valve disc between first and second angular positions relative to said seating surface,
space-defining means adjoin said passage, and
said seating surface is formed with an opening which communicates with said space and is arranged to communicate with said passage, said turning system rotating said valve system and said valve disc to said first angular position to span said passage and rotating said valve stem and said valve disc to said second angular position to shut off said passage.

2. The improvement set forth in claim 1, wherein said space-defining means is in the form of a chamber.

3. The improvement set forth in claim 1, wherein said space-defining means define a second passage.

4. The improvement set forth in claim 1, wherein said valve disc is elliptical.

5. The improvement set forth in claim 1, wherein
said seating surface defines a hollow frustum of a cone,
said valve disc has an elliptical rim which extends in said plane, and
said valve stem is axially movable to move said rim into seating contact with said seating surface.

6. The improvement set forth in claim 1, wherein said valve disc is eccentric with respect to said valve stem.

7. In a cyclically operable internal combustion engine, a disc valve control system comprising
means defining a combustion chamber,
valve seat means having a seating surface disposed adjacent said combustion chamber and including a passage communicating with said seating surface and with said combustion chamber,
a valve stem having an axis, and
a valve disc secured to said valve stem and defining adjacent to said seating surface a plane that extends at an oblique angle to said axis,
said valve stem being supported for axial movement to move said valve disc into and out of seating contact with said seating surface in said plane,
the improvement residing in that
said valve disc is non-circular,
turning means are slidably engaged by said valve stem for rotating said valve stem about said axis so as to rotate said valve disc between first and second angular positions relative to said seating surface,
space-defining means adjoin said passage, and
said seating surface is formed with an opening which communicates with said space and is arranged to communicate with said passage, said turning system rotating said valve stem and said valve disc to said first angular position to span said passage and rotating said valve stem and said valve disc to said second angular position to shut off said passage.

8. The improvement set forth in claim 7, wherein
said seating surface defines a hollow frustum of a cone,
said valve disc has an elliptical rim which extends in said plane, and
said valve stem is axially movable to move said rim into seating contact with said seating surface.

9. The improvement set forth in claim 7, including means for operating said turning means in step with the cyclic operation of said engine.

10. The improvement set forth in claim 7, including a computer for controlling the operation of said turning means.

11. The improvement set forth in claim 10, including sensor means for controlling said computer in dependence on the operating conditions of the internal combustion engine.

* * * * *